US006444890B2

(12) United States Patent
Kondo

(10) Patent No.: US 6,444,890 B2
(45) Date of Patent: Sep. 3, 2002

(54) MUSICAL TONE-GENERATING APPARATUS AND METHOD AND STORAGE MEDIUM

(75) Inventor: Masao Kondo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/738,441

(22) Filed: Dec. 15, 2000

(30) Foreign Application Priority Data

Dec. 17, 1999 (JP) ........................................ 11-358845

(51) Int. Cl.[7] ................................................ H04Q 1/18
(52) U.S. Cl. ......................................... 84/653; 84/659
(58) Field of Search ......................... 84/615, 622, 653, 84/659

(56) References Cited

U.S. PATENT DOCUMENTS 4,711,148 A 12/1987 Takeda et al.
4,736,333 A * 4/1988 Mead et al.
5,451,710 A * 9/1995 Shimizu
5,616,879 A * 4/1997 Yamauchi et al. ............ 84/653
5,945,620 A * 8/1999 Adamson ..................... 84/615

FOREIGN PATENT DOCUMENTS

JP 5-46955 7/1993

* cited by examiner

*Primary Examiner*—Jeffrey Donels
(74) *Attorney, Agent, or Firm*—Morrison & Foerster LLP

(57) ABSTRACT

There are provided a musical tone-generating apparatus and a musical tone-generating method which make it possible to distribute tone generation loads evenly between a plurality of musical tone-generating sections, even if musical tones designated for tone generation are more concentrated in some specific tone ranges,, to thereby reduce a tone generation load applied to each of the musical tone-generating sections, and a storage medium storing a program for executing the musical tone-generating method. Performance information is supplied which simultaneously instructs a start of generation of musical tones corresponding to each of a plurality of tone pitches. Each of a plurality of tone generators generates musical tones of at least one pitch name independently of each other, all of the tone generators being capable of generating musical tones of all pitch names. A musical tone of each tone pitch indicated by the supplied performance information is assigned to a corresponding one of the tone generators according to a pitch name corresponding to the each tone pitch. The tone generators are controlled such that the musical tone of the each tone is generated by the corresponding one of the tone generators.

20 Claims, 7 Drawing Sheets

| KN[KC] | PITCH NAME | PITCH NAME-ASSIGNED TG |
|---|---|---|
| KN[1] | C | TG1 |
| KN[2] | C# | |
| KN[3] | D | TG2 |
| KN[4] | D# | |
| KN[5] | E | TG3 |
| KN[6] | F | |
| KN[7] | F# | TG4 |
| KN[8] | G | |
| KN[9] | G# | TG5 |
| KN[10] | A | |
| KN[11] | A# | TG6 |
| KN[12] | B | |

FIG. 4

| KN[KC] | PITCH NAME | PITCH NAME-ASSIGNED TG |
|---|---|---|
| KN[1] | C | TG1 |
| KN[2] | C# | |
| KN[3] | D | TG2 |
| KN[4] | D# | |
| KN[5] | E | TG3 |
| KN[6] | F | |
| KN[7] | F# | TG4 |
| KN[8] | G | |
| KN[9] | G# | TG5 |
| KN[10] | A | |
| KN[11] | A# | TG6 |
| KN[12] | B | |

MUSICAL TONE-GENERATING APPARATUS AND METHOD AND STORAGE MEDIUM

BACKGROUND OF THE INVENTION

1. Field of the Invention

This invention relates to a musical tone-generating apparatus and a musical tone-generating method for simultaneously generating a plurality of musical tones by using a plurality of musical tone-generating means, and a storage medium storing a program for executing the musical tone-generating method.

2. Prior Art

Tones of musical performance generated by a harmonic (polyphonic) musical instrument, such as a piano and an organ, or a musical composition formed of a plurality of musical instrument parts can be synthesized and reproduced by using musical tone-generating means (tone generator (TG)) having a plurality (multiplicity) of channels, such as a sound source LSI or software which implements a plurality of tone-generating channels by time sharing. However, the operating speed of semiconductors and the processing speed of computers (CPU's) are inevitably limited, and hence the number of tone-generating channels which can be implemented by a single sound source LSI or software is also limited. Therefore, to reproduce or synthesize tones of musical performance generated e.g. by a piano or an orchestra, which has a great number of tones to be sounded, it is necessary to take a measure of arranging a plurality of sound source LSI's or a measurer of additionally connecting a plurality of tone generators to the tone generator via an interface such as MIDI. The use of such a plurality of TG's makes it possible to reduce the number of tones for simultaneous reproduction per TG, and at the same time maintain the largest possible number of tones that can be generated by the whole system. Musical tones can be assigned to the respective TG's e.g. by a method of dividing the whole range of musical tones to be generated into a plurality of tone ranges and assigning the tone ranges to the respective TG's. (This method is disclosed e.g. by U.S. Pat. No. 4,711,148).

In a conventional musical tone-generating apparatus employing the above method, each TG performs tone generation only when it receives a command to generate a musical tone within a tone range assigned thereto. However, in general, musical tones used in a musical composition, i.e. musical tones which the TG's are instructed to generate tend to be more concentrated in some specific ones of the divided tone ranges (in the case of a piano, musical tones are more often generated by keys in a central area of the keyboard), and hence load is largely varied between the TG's. As a result, a TG assigned with a tone range causing a heavy load thereon may not be capable of generating all designated musical tones.

Further, in the conventional tone-generating system, when a command for termination of tone generation is issued, generation of a corresponding one of musical tones being sounded is simply attenuated or damped. However, e.g. in an actual piano performance, the release of a key is accompanied by a unique sound peculiar to the releasing operation. More specifically, the unique sound may be a mechanical noise caused by a key or a damper, a resonance between such a mechanical noise and the whole piano or high-pitched sound strings having no dampers provided therefor, a chattering noise caused by contact between a damper and a string, or the like. Further, in a harpsichord performance, it is known that a predetermined key-off sound (more precisely, a key-off sound having a predetermined characteristic different from one key to another) is generated at each key release. These sounds constitute a characteristic feature of a piano or a harpsichord. Therefore, in order to reproduce a more vivid tone color, it is necessary to take generation of the accompanying sounds or noises into consideration.

SUMMARY OF THE INVENTION

It is a first object of the invention to provide a musical tone-generating apparatus and a musical tone-generating method which make it possible to distribute tone generation loads evenly between a plurality of musical tone-generating sections, even if musical tones designated for tone generation are more concentrated in some specific tone ranges, to thereby reduce a tone generation load applied to each of the musical tone-generating sections, and a storage medium storing a program for executing the musical tone-generating method.

It is a second object of the invention to provide a musical tone-generating apparatus and a musical tone-generating method which are capable of generating tones caused by operations on a musical instrument for termination of tone generation, to thereby reproduce more real performance tones to be generated by the musical instrument, and a storage medium storing a program for executing the musical tone-generating method.

To attain the first object, according to a first aspect of the invention, there is provided a musical tone-generating apparatus comprising a performance information supply section that supplies performance information simultaneously instructing a start of generation of musical tones corresponding to each of a plurality of tone pitches, a musical tone-generating section group comprising a plurality of musical tone-generating sections, each of which generates musical tones of at least one pitch name independently of each other, all the plurality of musical tone-generating sections being capable of generating musical tones of all pitch names, an assignment section that assigns a musical tone of each tone pitch indicated by the performance information supplied by the performance information supply section to a corresponding one of the musical tone-generating sections of the musical tone-generating section group according to a pitch name corresponding to the each tone pitch, and a control section that controls the musical tone-generating sections such that the musical tone of the each tone is generated by the corresponding one of the musical tone-generating sections.

Preferably, the musical tone-generating apparatus includes a musical tone output section that adds together outputs from the musical tone-generating sections, and delivers a sum of the outputs.

More preferably, the musical tone-generating sections are connected in series with each other, whereby the musical tone output section sequentially adds together the outputs from the musical tone-generating sections, and delivers the sum of the outputs.

To attain the second object, according to a second aspect of the invention, there is provided a musical tone-generating apparatus comprising a performance information supply section that supplies performance information including at least key-on information and key-off information, a musical tone-generating section that is responsive to supply of the key-on information from the performance information supply section, for generating a main musical tone having a tone pitch and at least one other characteristic indicated by the key-on information, and is responsive to supply of the key-off information from the performance information supply section, for attenuating a main musical tone having a tone pitch indicated by the key-off information and being generated and for generating a key-off sound, a determination section that determines at least one characteristic of the key-off sound to be generated, based on at least one characteristic of the main musical tone, and a control section that controls the musical tone-generating section such that the key-off sound is generated by the musical tone-generating section according to the at least one characteristic of the key-off sound determined by the determination section.

Preferably, the musical tone-generating apparatus includes a detecting section that detects at least one parameter related to the at least one characteristic of the key-off sound to be generated, and the determination section determines the at least one characteristic of the key-off sound to be generated, based on the detected at least one parameter.

More preferably, the detecting section detects the at least one characteristic of the main musical tone of the tone pitch indicated by the key-off information when the key-off information is supplied from the performance information supply section.

Preferably, the determination section sets the at least one characteristic of the key-off sound to be generated to at least one characteristic corresponding to the tone pitch indicated by the key-off information, when the key-off information is supplied from the performance information supply section.

More preferably, the detecting section includes a time measurement section that measures, as the at least one parameter, time elapsed from the supply of the key-on information to the supply of the key-off information.

Alternatively, the musical tone-generating section includes a main musical tone-generating section that generates the main musical tone, and the detecting section includes a main musical tone characteristic-detecting section that detects, as the at least one parameter, at least one of an output level and an envelope characteristic of the main musical tone-generating section when the key-off information is supplied from the performance information supply section.

Alternatively, the musical-tone generating section includes a main musical tone-generating section that generates the main musical tone, and a key-off sound-generating section that generates the key-off sound, the detecting section including a time measurement section that measures, as one of the at least one parameter, time elapsed from the supply of the key-on information to the supply of the key-off information, and a main musical tone characteristic-detecting section that detects, as another of the at least one parameter, at least one of an output level and an envelope characteristic of the main musical tone-generating section when the key-off information is supplied, the determination section determining the at least one characteristic of the key-off sound to be generated, based on at least one of an output from the time measurement section and an output from the main musical tone characteristic-detecting section.

Further preferably, the determination section determines the at least one characteristic of the key-off sound to be generated, based on the output from the main musical tone characteristic-detecting section, when the time measured by the time measurement section is longer than a predetermined time period.

Further preferably, the determination section includes a selecting device that selects one of the output from the time measurement section and the output from the main musical tone characteristic-detecting section, the determination section determining the at least one characteristic of the key-off sound to be generated, based on the selected output.

To attain the first object, according to a third aspect of the invention, there is provided a storage medium storing a program that can be executed by a computer, the program comprising a supply module that causes a performance information supply section to supply performance information simultaneously instructing a start of generation of musical tones corresponding to each of a plurality of tone pitches, a musical tone-generating section module that causes musical tones of all pitch names to be generated by a plurality of musical tone-generating sections, each of which generates musical tones of at least one pitch name independently of each other, an assignment module that assigns a musical tone of each tone pitch indicated by the supplied performance information to a corresponding one of the musical tone-generating sections according to a pitch name corresponding to the each tone pitch, and a control module that controls the musical tone-generating sections such that the musical tone of the each tone is generated by the corresponding one of the musical tone-generating sections.

To attain the second object, according to a fourth aspect of the invention, there is provided a storage medium storing a program that can be executed by a computer, the program comprising a supply module that causes a performance information supply section to supply performance information including at least key-on information and key-off information, a musical tone-generating module that is responsive to supply of the key-on information from the performance information supply section, for generating a main musical tone having a tone pitch and at least one other characteristic indicated by the key-on information, and is responsive to supply of the key-off information from the performance information supply section, for attenuating a main musical tone having a tone pitch indicated by the key-off information and being generated and for generating a key-off sound, a determination module that determines at least one characteristic of the key-off sound to be generated, based on at least one characteristic of the main musical tone, and a control module that controls the musical tone-generating module such that the key-off sound is generated by the musical tone-generating module according to the at least one characteristic of the key-off sound determined by the determination module.

To attain the first object, according to a fifth aspect of the invention, there is provided a musical tone-generating method comprising the steps of causing a performance information supply section to supply performance information simultaneously instructing a start of generation of musical tones corresponding to each of a plurality of tone pitches, causing musical tones of all pitch names to be generated by a plurality of musical tone-generating sections, each of which generates musical tones of at least one pitch name independently of each other, assigning a musical tone of each tone pitch indicated by the supplied performance information to a corresponding one of the musical tone-generating sections according to a pitch name corresponding to the each tone pitch, and controlling the musical tone-generating sections such that the musical tone of the each tone is generated by the corresponding one of the musical tone-generating sections.

To attain the second object, according to a sixth aspect of the invention, there is provided a musical tone-generating method comprising the steps of causing a performance information supply section to supply performance information including at least key-on information and key-off information, generating a main musical tone having a tone pitch and at least one other characteristic indicated by the key-on information in response to supply of the key-on information from the performance information supply section, generating a key-off sound while attenuating a main musical tone having a tone pitch indicated by the key-off information and being generated, in response to supply of the key-off information from the performance information supply section, determining at least one characteristic of the key-off sound to be generated, based on at least one characteristic of the main musical tone, and controlling the key-off sound-generating step such that the key-off sound is generated according to the determined at least one characteristic of the key-off sound.

The above and other objects, features, and advantages of the present invention will become apparent from the following detailed description taken in conjunction with the accompanying drawings.

BRIEF DESCRIPTION OF THE DRAWINGS

FIG. 4 is an example of table data for determining a pitch name corresponding to pitch name information included in a key code KC, and a TG to which the pitch name is to be assigned, from the pitch name information;

DETAILED DESCRIPTION OF PREFERRED EMBODIMENT

The present invention will now be described in detail with reference to drawings showing an embodiment thereof.

Figure 1:
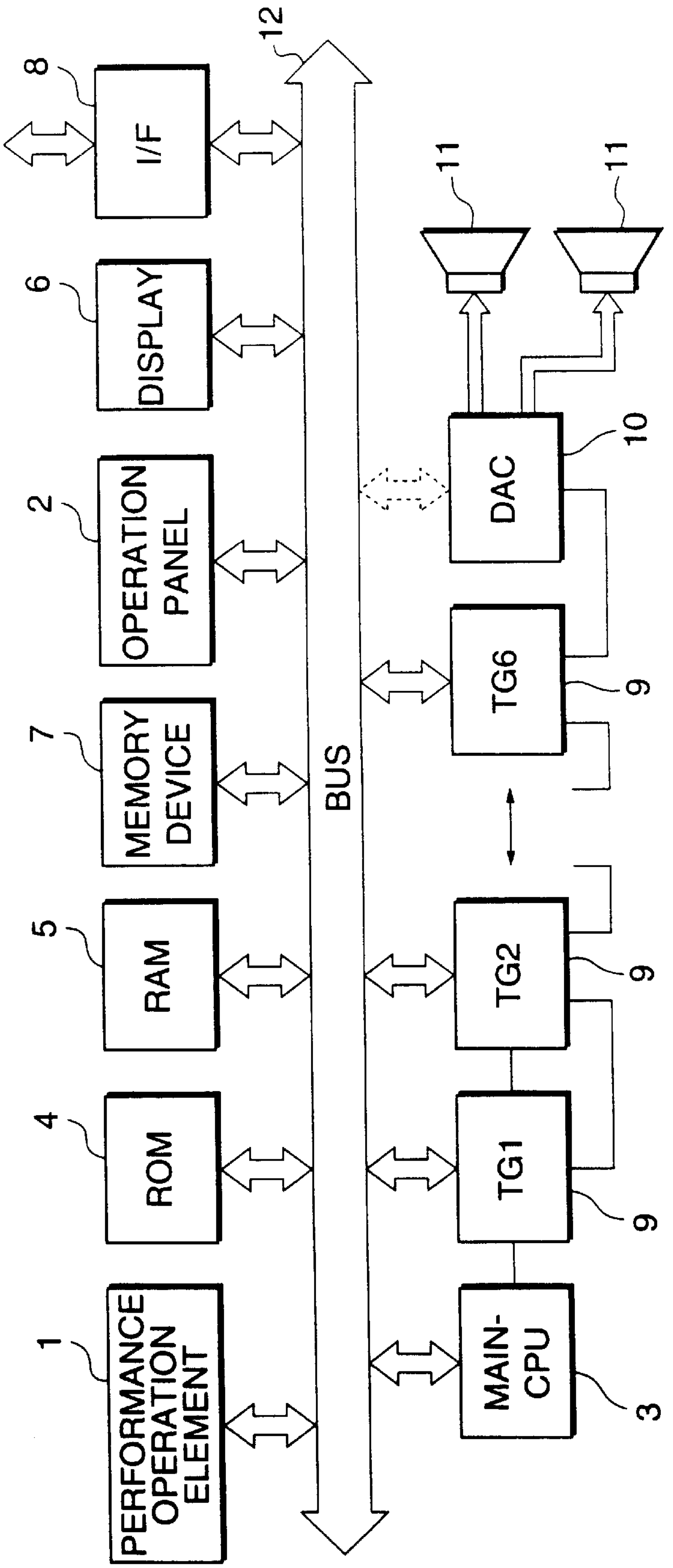
FIG. 1 is a block diagram schematically showing the whole arrangement of a musical tone-generating apparatus according to an embodiment of the present invention.

Referring first to FIG. 1, there is schematically shown the whole arrangement of a musical tone-generating apparatus according to an embodiment of the present invention. In the embodiment, an electronic keyboard instrument is specifically adopted as an example of the musical tone-generating apparatus, for the convenience of description. Of course, the present invention is not applicable to the electronic keyboard instrument alone, but it is also applicable to other electronic musical instruments including electronic string instruments and electronic wind instruments, a sound source board, and so forth.

As shown in FIG. 1, the musical tone-generating apparatus includes a performance operation element (more specifically, a keyboard) 1 for inputting performance information, an operation panel 2 provided with a plurality of switches for inputting various kinds of information, a main CPU 3 that controls the overall operation of the whole system, a ROM 4 that stores control programs to be executed by the CPU 3, table data and the like, and a RAM 5 that temporarily stores performance information, various kinds of input information, operation results and the like, a display 6 comprised of a liquid crystal display (LCD), and light-emitting diodes (LED's), for displaying various kinds of information, a memory device 7 that stores various application programs including the above-mentioned control programs, various kinds of data, as typified by a hard disk device, interfaces (I/F) 8, such as a musical instrument digital interface (MIDI) for receiving MIDI signals from external devices or systems and sending out MIDI signals to the same, and a communication interface for transmitting and receiving data e.g. to and from a server computer via a communication network, not shown, a plurality of (e.g. six) TG's 9 that generate stereo musical signals (digital signals) based on performance information input via the performance operation element 1, preset performance information or the like, a DAC (Digital-to-Analog Converter) 10 that converts the digital stereo musical signals generated by the plurality of TG's 9 to analog ones, and left and right sound systems 11 each comprised e.g. of an amplifier and a speaker, for converting the stereo musical signals from the DAC 10 into stereo sounds. The components 1 to 9 are connected to each other via a bus 12.

The six TG's 9 are connected in series to the main CPU 3 via serial interfaces. The main CPU 3 outputs the performance information input via the performance operation element 1 or the preset performance information to a TG (TG 1) 9 at the immediately adjacent stage. Each TG 9 receives the performance information via a corresponding one of the serial interfaces and transmits the same as it is to a TG 9 at the immediately following stage without processing the same. As described in detail hereinafter with reference to FIG. 2, the TG's each have a sub CPU 21 provided therein for constantly monitoring whether or not performance information transmitted from the main CPU 3 is to be processed by the TG and, when it is determined that the performance information is to be processed by the TG, the TG generates a musical tone signal (more specifically, a waveform sample) based on the performance information.

Further, each TG 9 is provided with a serial interface (different from the above-mentioned serial interface for transmission and reception of performance information) for transmission and reception of the generated musical tone signal. The TG's 9 are connected to each other via the serial interfaces, and the last TG (TG 6) is connected to the DAC 10. The TG's 9 have respective different roles assigned thereto, respectively, and generate musical tones of different kinds (more specifically, of different pitch names), as described in detail hereinafter with reference to FIG. 2).

Each TG 9 has a buffer, not shown, for storing a musical tone signal (musical waveform sample). The buffer included in the TG arranged at a location immediately following the main CPU 3, i.e. the first TG (TG 1) is used for transmitting a musical tone signal generated by the TG 1 to the immediately following TG, i.e. the second TG (TG2) in predetermined timing. The buffer included in each of the TG's each arranged between other TG's, i.e. the second to fifth TG's (TG's 2 to 5) is used for adding a musical tone signal generated by the TG to one transmitted from the immediately preceding TG and then transmitting the resulting signal to the immediately following TG in predetermined timing. Further, the buffer included in the TG immediately preceding the DAC 10, i.e. the last TG (TG 6) is used for adding a musical tone signal generated by the TG to one transmitted from the immediately preceding TG and then transmitting the resulting signal to the DAC 10 in predetermined timing. The buffers may be each formed of two separate buffers that store a left-channel musical tone waveform sample and a right-channel musical tone waveform sample, respectively, or alternatively, they may be formed of a single buffer that stores a mixture of left-channel and right-channel musical tone waveform samples.

The buffer in the last TG (TG 6) stores a result of accumulation of musical tone signals generated by all the TG's 9 at the maximum. The DAC 10 reads out the result of the accumulation from the buffer waveform sample by waveform sample (when the buffer is formed of a single buffer) and converts each musical tone signal to an analog signal, followed by outputting the analog signal to one of the left and right sound systems 11.

The display 6 includes an LCD, as mentioned above. In the present embodiment, the LCD uses red, green, and blue LED's as a back light source, and is capable of controlling back light color to various colors by changing the luminance of each of these LED's. The LCD can be constructed e.g. of a lamination of a layer of the LED's of the three colors, a diffusion plate that diffuses light from the LED's evenly on a display screen, and a light transmission type LCD body. However, this is not limitative, but any construction may be adopted insofar as the back light color can be controlled. When the above construction is adopted, the components, i.e. the LED's, the diffusion plate, and the light transmission type LCD body may be conventional or existing types. The control of the back light color is carried out by changing an amount of current supplied to each of the LED's. If pulse current is supplied to the LED's to cause the same to emit light, the amplitude, frequency, duty ratio, etc. of the pulse current supplied to the respective LED's are varied to change the luminance of the respective LED's, to thereby control the back light color. In addition, the colors and luminance of the respective LED's may be time-varied.

The above described control of the light colors and luminance of the respective LED's of the LCD is carried out in accordance with operating conditions (operation modes) of the musical tone-generating apparatus, the contents of display, the user s operation, the state of signals received from an external system or apparatus, the state of signals sent to the external system or apparatus, the model of a musical instrument adopted as the musical tone-generating apparatus, and so forth, whereby the back light color is controlled to change the background color of the LCD. This facilitates recognition of the operating condition of the musical tone-generating apparatus and also makes it possible to achieve visual effects based on color changing according to music or the like.

More specifically, the following examples of the back light color control may be executed by the electronic keyboard instrument according to the present embodiment:

(1) Control in response to the sound volume and the strength of performance touch;

(2) Control in response to the selected tone color or the selected kind of tone color;

(3) Control in response to the operation mode or contents displayed, such as a color selection screen, a parameter edit screen, and an automatic performance screen;

(4) Control in response to a control signal, such as a MIDI signal, from an external system or apparatus;

(5) Control in response to operating manners of an auxiliary performance operation element such as a pedal;

(6) Control in response to a tone pitch designated by key depression (i.e. pitch of a generated tone);

(7) Control in response to style, rhythm pattern, tempo, tonality, progress, etc. of automatic performance or accompaniment;

(8) Control in response to selection or setting of an acoustic effect, such as reverberation and chorus, and a characteristic (e.g. level) of an effect sound (e.g. a reverberation); and (9) Control in response to musical tones, voices, or the like input from an external system or apparatus.

The memory device 7 can store control programs to be executed by the main CPU 3, as described hereinbefore. If the ROM 4 does not store the control programs, the control programs may be stored in the memory device 7 beforehand, and read from the memory device 7 into the RAM 4, making it possible to cause the main CPU 3 to perform substantially the same operations as in the case where the control programs are stored in the ROM 4. This arrangement facilitates addition of control programs and upgrading of the version of the programs.

The memory device 7 may be not only in the form of a hard disk as described above, but also in the form of a floppy disk (FD) device, a compact disk read-only memory (CD-ROM) device, a magneto-optical disk (MO) device, etc. to allow various forms of media to be used.

The MIDI interface of the I/F's 8 is not limited to one designed specifically for the system of the present embodiment, but it may be formed by a general-purpose interface such as a RS-232, a USB (Universal Serial Bus), an IEEE 1394, or the like. In this case, data other than a MIDI message may be transmitted/received simultaneously.

The communication interface of the I/F's 8 is connected to a communication network, such as LAN (local area network), the Internet, and telephone lines, and is connected to a server computer through the communication network. If the memory device 7 does not store the programs or parameters, the communication interface may be used for downloading the programs and parameters from the server computer. A client computer (musical tone-generating apparatus in the present embodiment) transmits commands to the server computer through the communication interface and communication network, to request downloading of the programs and parameters. The server computer receives the commands and delivers the requested programs and parameters to the client computer through the communication network, and the computer receives these programs and parameters through the communication interface, and stores them in the memory device 7. Thus, the downloading of the programs and parameters is completed.

Further, the system of the present embodiment may be provided with an interface for directly transmitting and receiving data to and from an external computer or the like.

Although the musical tone-generating apparatus of the present embodiment is constructed on a dedicated apparatus (electronic keyboard instrument) as described above, this is not limitative, but the musical tone-generating apparatus may be constructed on a general-purpose personal computer.

Figure 2:
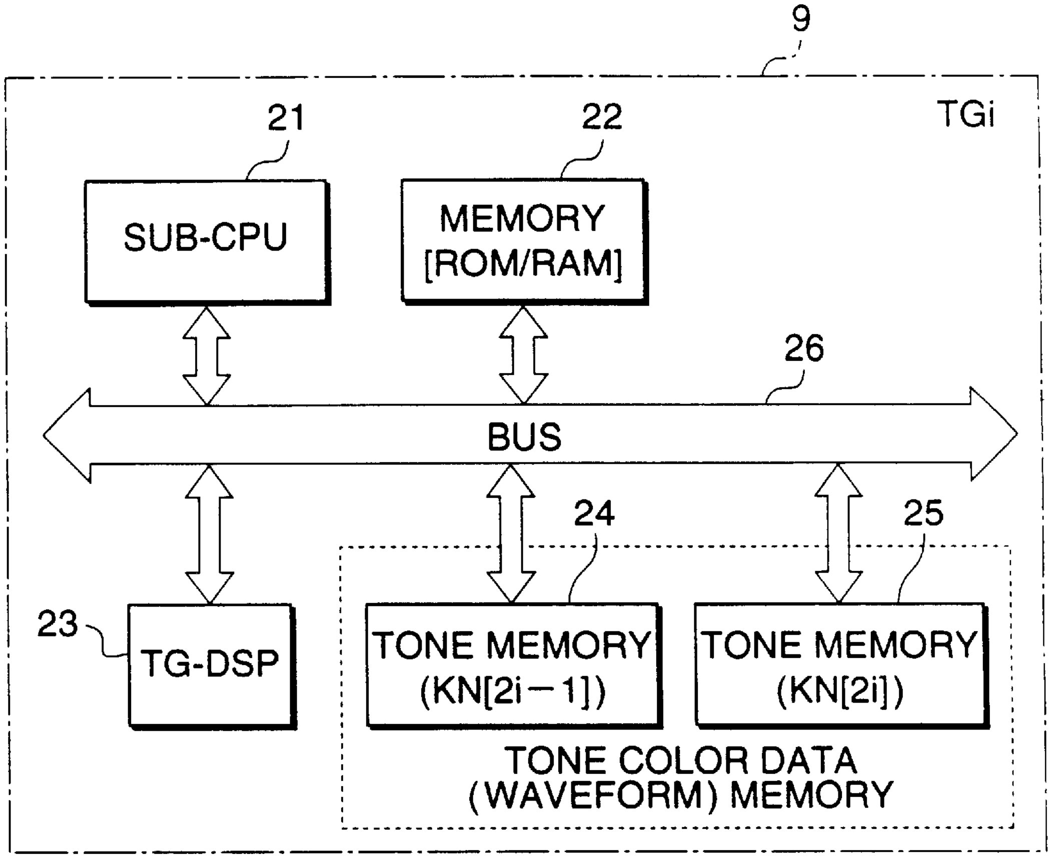
FIG. 2 is a block diagram showing details of the arrangement of a TG of a plurality of TG's appearing in FIG. 1.

FIG. 2 shows details of the arrangement of a TGi (i represents any one of the integers 1 to 6) of the plurality of TG's 9. The TG's 9 have the same construction with each other, and hence description will be made of only one of them.

As shown in the figure, the TGi is comprised of the sub-CPU 21 that controls the overall operation of the whole TGi, a memory 22 comprised of a ROM that stores control programs to be executed by the sub-CPU 21, table data, and other data, and a RAM that temporarily stores performance information, various kinds of input information, and operation results, a TG-DSP (Digital Signal Processor) 23 that is controlled by the sub-CPU 21 to read a musical tone waveform sample stored in a tone color data memory 24 or 25 and generate a musical tone signal based on the read out musical tone waveform sample read out from the tone color data memory, the tone color data memory 24 that stores musical tone waveform samples associated with a (2i–1)-th pitch name KN (2i–1), i.e. musical tone waveform samples of the (2i–1)-th pitch name KN (2i–1) of all tone colors that can be generated and in all octaves, and the tone color data memory 25 that stores musical tone waveform samples associated with a 2i-th pitch name KN (2i), i.e. musical tone waveform samples of the 2i-th pitch name KN (2i) of all tone colors that can be generated and in all octaves. The components 21 to 25 are connected to each other via a bus 26.

The sub-CPU 21 is connected to the sub-CPU of an immediately preceding TGi–1 (or to the main CPU 3 when the immediately preceding TG does not exist) and to the sub-CPU of the immediately following TGi+1 (the sub-CPU 21 is used only for reception of performance information when the immediately following TG does not exist) via the respective serial interfaces. As described hereinbefore, the sub-CPU 21 receives performance information output from the main CPU 3 directly or via the sub-CPU of the immediately preceding TGi–1 and transmits the performance information to the immediately following TGi+1 as it is (when the immediately following TG exists) without processing the same. Further, the sub-CPU 21 constantly monitors, as described hereinbefore, whether or not performance information which it receives designates a musical tone signal to be generated by the present TGi. When the received performance information instructs generation of a musical tone signal by the present TGi, i.e. generation of any one of the musical tone signals of the pitch names KN (2i–1) and KN (2i), the sub-CPU 21 causes the TG-DSP 23 to generate the musical tone signal. More specifically, the TG-DSP 23 reads a musical tone waveform sample as a base for generation of the musical tone signal, from one of the tone color data memories 24 and 25 which corresponds to the designated pitch name, and then executes predetermined processing (i.e. processing in response to the performance information) on the musical tone waveform sample to thereby generate the desired musical tone signal.

It should be noted that the TGi is capable of generating not only a musical tone signal indicative of a main musical tone of any one of the pitch names KN (2i–1) or KN (2i) but also musical tone signals indicative of two kinds of auxiliary musical tones, described hereinafter, accompanying the main musical tone. In the present embodiment, auxiliary tone characteristic information used for generation of auxiliary musical tones is not supplied from the main CPU 3, but generated within the TGi (needless to say, the auxiliary tone characteristic information may be supplied from the main CPU 3). The auxiliary tone characteristic information may be generated e.g. by a method that auxiliary tone characteristic information is stored in the ROM within the memory 22 in the form of table data in advance, and upon detection of performance information instructing the TGi to generate a main musical tone, the sub-CPU 21 reads out auxiliary tone characteristic information corresponding to the performance information from the table, or by a method that the sub-CPU 21 arithmetically calculates and generates auxiliary tone characteristic information corresponding to performance information instructing the TGi to generate a main musical tone, upon detection of the performance information.

As described above, according to the present embodiment, musical tones corresponding to the two kinds of pitch names KN (2i–1) and KN (2i) are generated by one TGi, and therefore it takes six TG's 9 in all to generate musical tones corresponding to all the pitch names, i.e. the twelve pitch names. It goes without saying that the number of pitch names of musical tones to be generated by one TG is not limited to two, but the number may be smaller than two (that is, in this case each TG generates musical tones corresponding to one pitch name) or larger than two (that is, in this case the number of pitch names per TG is determined such that the musical tones corresponding to all the pitch names are shared by a plurality of TG's used). Further, in the present embodiment, the system according to the present embodiment is adapted for equal temperament scales (equally tempered scales), and hence the number of pitch names of musical tones that can be generated is "12", but if another temperament is employed, the number of pitch names assigned to each TG can be determined according to the number of pitch names of the temperament.

Further, although in the present embodiment, the TGi is provided with two tone color data memories 24 and 25 independent of each other for generating respective musical tones corresponding to two kinds of pitch names KN (2i–1) and KN (2i), so as to generate a musical tone corresponding to a pitch name KN (2i–1) based on a musical tone waveform sample read from the tone color data memory 24 and a musical tone corresponding to a pitch name KN (2i) based on a musical tone waveform sample read from the tone color data memory 25, this is not limitative, but musical tone waveform samples of all reproducible tone colors in all octave ranges, which are associated with the two kinds of pitch names KN (2i–1) and KN (2i), may be all stored in a single tone color data memory. In this case, by adding to each of two musical tone waveform sample groups associated with the respective kinds of pitch names information for distinction between the two groups, one group can be conveniently distinguished from the other automatically. As described above, when musical tone signals corresponding respectively e.g. to four kinds of pitch names are generated by one TG, musical tone waveform samples of all reproducible tone colors in all octave ranges, which correspond to the four kinds of pitch names, may be all stored in a single tone color data memory, or alternatively, two groups of the musical tone signals corresponding respectively to the two kinds of pitch names may be stored in each of two tone color data memories. The contents to be stored in each of tone color data memories, the capacity of each memory, and the number of the memories to be used may be changed in dependence on the model and grade of a product of the musical tone-generating apparatus as a product.

Further, in the present embodiment, a dedicated musical tone waveform sample is used for generating a specific musical tone signal corresponding to each pitch name, but when the number of TG's or the capacity of a waveform memory is limited e.g. due to manufacturing costs or the like, for instance, a musical tone waveform sample for use in generating a musical tone signal corresponding to a pitch name C may be also used for generating a musical tone signal corresponding to another pitch name, such as C# or B. In this case, the reading speed for reading the waveform sample corresponding to the pitch name C is changed from the sampling speed at which the waveform is sampled, such that the reading speed agrees with a desired pitch (i.e. the pitch of C# or B). As another specific example, four pitch name data of respective pitch names C, D#, F#, and A are separately stored in two TG's, for instance, such that the data of the pitch names C and D# are stored in the TG 1, and the data of the pitch names F# and A are stored in the TG 2, whereby the TG 1 generates musical tones corresponding respectively to C, C#, and D from a musical tone waveform sample for C, and musical tones corresponding respectively to D#, E, and F from a musical tone waveform sample for D#, while the TG 2 generates musical tones corresponding respectively to F#, E, and F from a musical tone waveform sample for F#, and musical tones corresponding respectively to A, A#, and B from a musical tone waveform sample for A.

Next, the outline of control processing executed by the musical tone-generating apparatus according to the present embodiment constructed as above will be described with reference to FIGS. 3 to 5, and then detailed description of the same will be made with reference to FIGS. 6 and 7.

Figure 3:
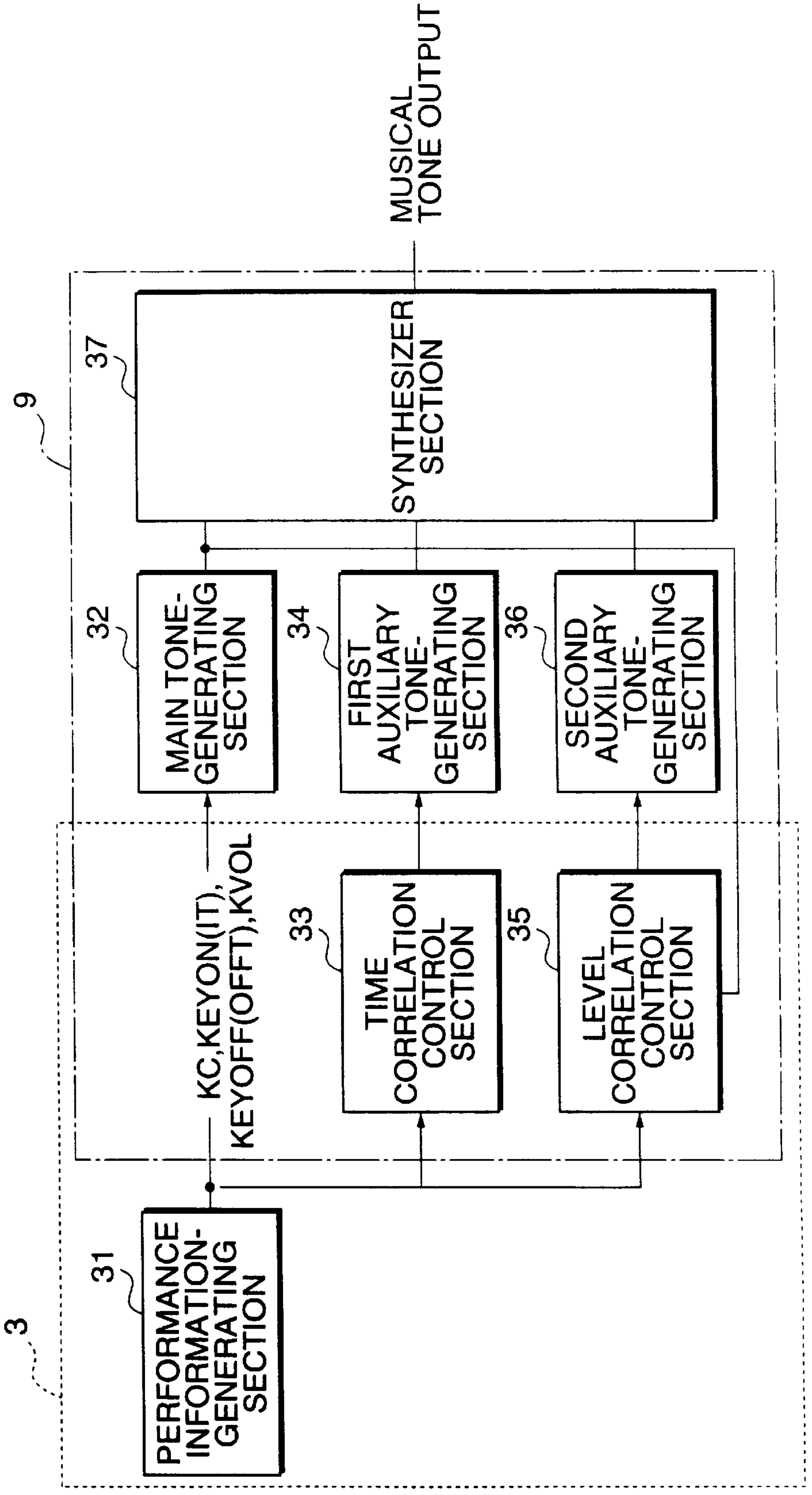
FIG. 3 is a block diagram illustrating hardware shown in FIG. 1 and FIG. 2 in terms of control processes executed by the hardware.

The musical tone-generating apparatus according to the embodiment primarily executes the following three kinds of control processes:

(1) Main musical tone-generating process (2) First auxiliary musical tone-generating process (3) Second auxiliary musical tone-generating process FIG. 3 illustrates hardware shown in FIG. 1 and FIG. 2 in terms of control processes, i.e. control processes (1) to (3) executed by the hardware.

In the figure, a performance information-generating section 31 corresponding to the main CPU 3 generates performance information, such as a key code KC, key-on data KEYON including initial touch data IT indicative of a key-on speed, key-off data KEYOFF including off-touch data OFFT indicative of a key-off speed, volume data KVOL, and so forth, based on performance information input through the performance operation element 1 and preset performance information, and outputs the generated performance information to a main tone-generating section 32, a time correlation control section 33, and a level correlation control section 35.

In the present embodiment, the key code KC is formed of pitch name information (any one of integer values 1 to 12; and 1 corresponds to C, 2 to C#, 3 to D, 4 to D#, 5 to E, 6 to F, 7 to F#, 8 to G, 9 to G#, 10 to A, 11 to A#, and 12 to B) and octave number information for designating the number of octaves.

The main tone-generating section 32 corresponds to a function of the TG 9 and generates a musical tone signal indicative of a main musical tone, based on performance information generated by the performance information-generating section 31. The generation of a musical tone signal indicative of a main musical tone is carried out by assigning a musical tone signal corresponding to a pitch name KN (KC) designated by the key code KC to a TG 9 which should generate the musical tone signal, based on table data shown in FIG. 4. The TG 9 to which generation of the musical tone signal of the main musical tone is assigned reads out a musical tone waveform sample corresponding to a designated tone color as well as to the pitch name information and octave number information included in the generated key code KC from the corresponding tone color data memory, and then processes the read out musical tone waveform sample is processed such that it has an envelope characteristic based on the generated initial touch data IT.

The time correlation control section 33 corresponds to the main CPU 3 and the sub-CPU 21 within the TG 9 and designates the maximum level or an envelope characteristic of a first auxiliary musical tone to be generated to a first auxiliary tone-generating section 34 at a subsequent stage subsequent thereto. More specifically, with respect to each specific key code KC, the time correlation control section 33 measures a time period elapsed from a time point the key-on data KEYON is generated to a time point the key-off data KEYOFF is generated e.g. by using a corresponding one of software timers each provided on the RAM 5 and allocated to each key code KC, determines the maximum level or envelope characteristic of a first auxiliary musical tone to be generated by the first auxiliary tone-generating section 34 based on the measured time period, and then sends a value indicative of the determined maximum level or envelope characteristic to the first auxiliary tone-generating section 34. In response to this, the first auxiliary tone-generating section 34 generates the first auxiliary musical tone whose volume increases from the time point the key-off data KEYOFF was generated according to the predetermined envelope and decreases after having reached the determined maximum level VOL 1, according to the predetermined envelope, as shown in FIG. 5. In this connection, the value of the off-touch data OFFT may be reflected in the first auxiliary musical tone.

The level correlation control section 35 corresponds to the main CPU 3 and the sub-CPU 21 within the TG 9 and designates the maximum level or an envelope characteristic of a second auxiliary musical tone to be generated to a second auxiliary tone-generating section 36 at a subsequent stage. More specifically, the level correlation control section 35 detects an output level or an envelope value of the main tone-generating section 32 at a time point the key-off data KEYOFF is generated, determines the maximum level or envelope characteristic of the second auxiliary musical tone to be generated by the second auxiliary tone-generating section 36, based on the detected level or value, and then sends a value indicative of the determined maximum level or envelope characteristic to the second auxiliary tone-generating section 36. In response to this, the second auxiliary tone-generating section 36 generates the second auxiliary musical tone whose volume increases from the time point the key-off data KEYOFF was generated according to the predetermined envelope and decreases after having reached the maximum level VOL 2 according to the predetermined envelope, as shown in FIG. 5.

Figure 5:
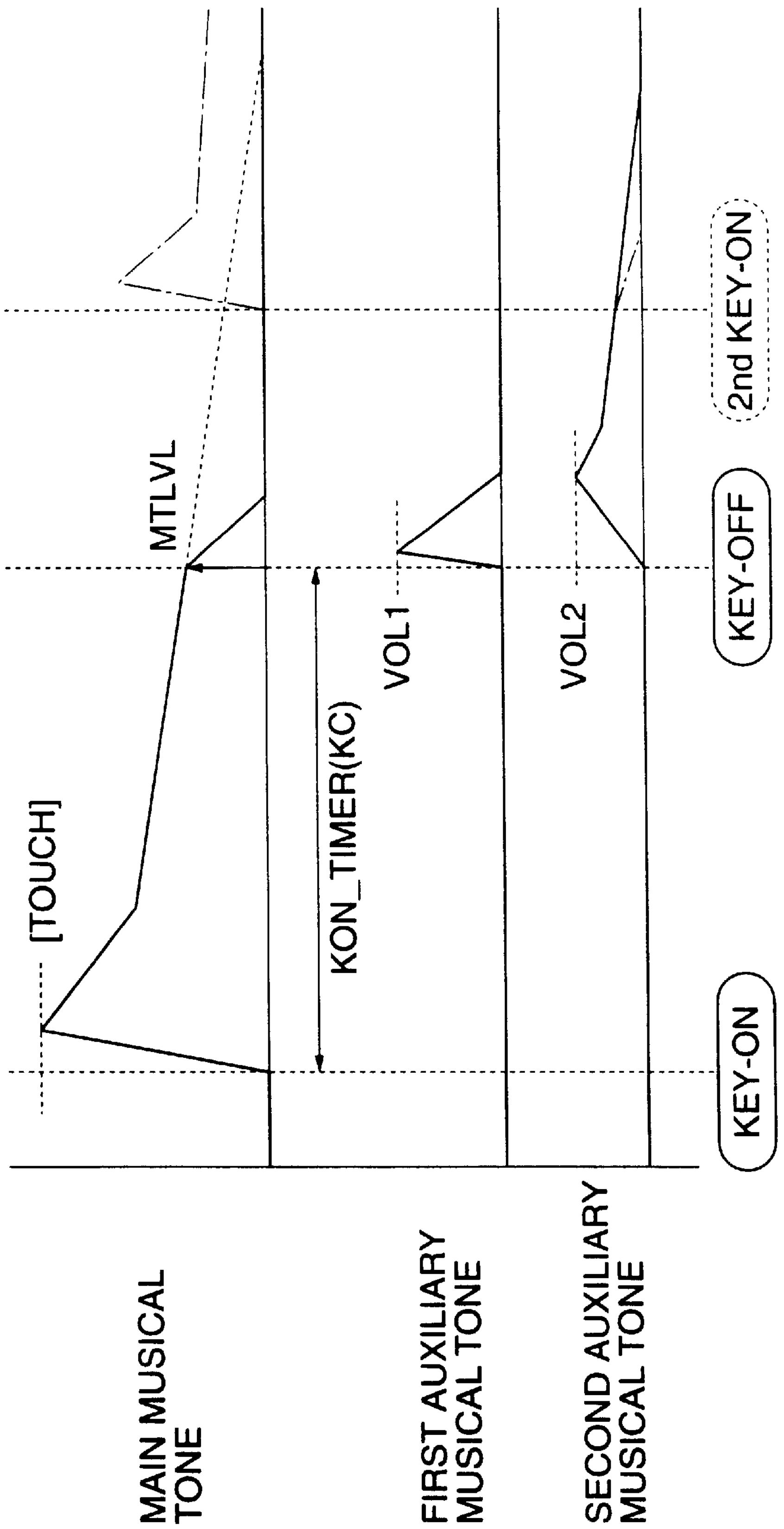
FIG. 5 shows an example of characteristics of a main musical tone, and first and second auxiliary musical tones.

In the FIG. 5 example, the second auxiliary musical tone takes longer time before it ceases to be generated than the first auxiliary musical tone. If second key-on data (2nd KEYON) is generated before the second auxiliary musical tone ceases to be generated, it is preferable to accelerate attenuation of the second auxiliary musical tone, simultaneously when a main musical tone rises, as shown by a one-dot chain line. The illustrated second auxiliary musical tone is a decaying tone, and hence the tone may be left to its own decaying without accelerating the attenuation.

Further, although the maximum tone volume of the second auxiliary musical tone is set, similarly to that of the first auxiliary musical tone (though the detection methods are different), to a value related to the output level of the main tone-generating section 32 at a time point the key-off data KEYOFF was generated, this is not limitative, but it may be set to a predetermined value independent of the output level of the main tone-generating section 32, or alternatively, to a value related not to the output level of the main tone-generating section 32 but to the tone pitch (key code KC) of the main musical tone.

A synthesizer section 37 corresponds to the buffer of the TG 9, and adds together the main musical tone generated by the main tone-generating section 32, the first auxiliary musical tone generated by the first auxiliary tone-generating section 34, and the second auxiliary musical tone generated by the second auxiliary tone-generating section 36, to thereby synthesize a musical tone signal and outputs the same to the DAC 10.

It should be noted that the auxiliary musical tone (first and/or second auxiliary musical tones) may have variations in musical tone elements, such as a pitch and a tone color, according to the off-touch data OFFT (or the initial touch data IT), key depression time, and the state of generation of a musical tone at a key-off event. This makes it possible to simulate a state of the pitch falling after a key-off event e.g. when the tone color of a main musical tone is of a wind instrument.

The key-off sound (auxiliary musical tone) control is basically carried out so as to cause a key-off sound to sound natural (naturally continuous with a decaying main musical tone) after a key-off event. In the case of a tone color of a tone which simply decays, such as that of a piano, it is easier to control the corresponding key-off sound according to time elapsed after the start of generation of the main musical tone (first auxiliary tone control). On the other hand, in the case of a tone color of a tone which is a sustain sound, such as that of a wind instrument (having little correlation between time elapsed after the start of generation of the main musical tone and the volume level of the tone), it is difficult to control the corresponding key-off sound according to the elapsed time, and hence the key-off sound is controlled based on the volume level or information related to the volume level (second auxiliary tone control). Therefore, if the two control methods are provided such that either one of them is selectively used or both of them are used simultaneously, depending on the tone color of a main musical tone, it is possible to cope with various kinds of tone colors and further increase the variety of tone colors.

Next, the above control processes will be described in detail.

Figure 6:
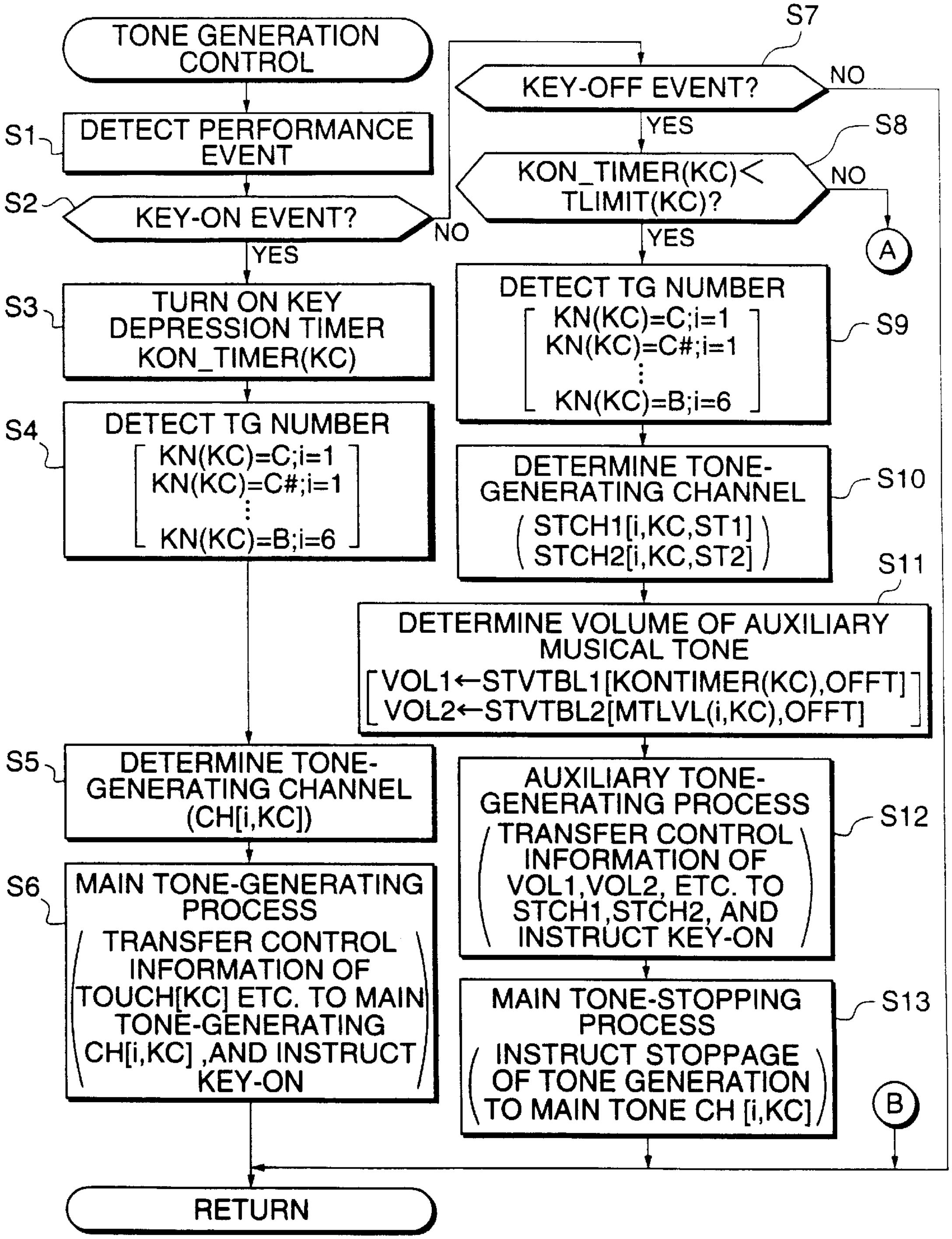
FIG. 6 is a flowchart showing a routine for carrying out a tone generation control process executed by the FIG. 1 musical tone-generating apparatus, particularly by a main CPU or a sub-CPU appearing in FIG. 2.
Figure 7:
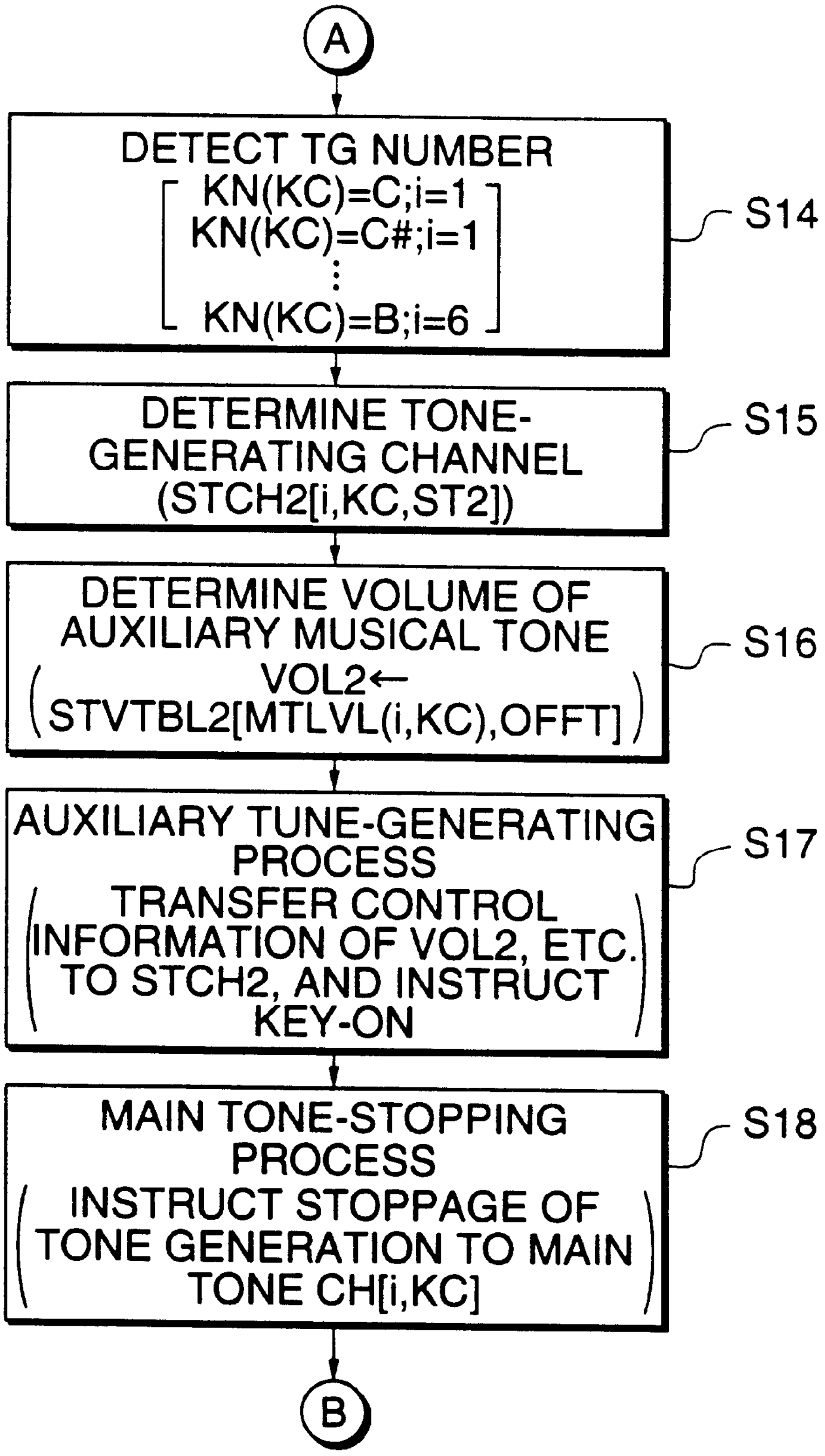
FIG. 7 is a continued part of the FIG. 6 flowchart.

FIGS. 6 and 7 are a flowchart showing a routine for tone generation control processing which is executed by the musical tone-generating apparatus of the present embodiment, particularly by the main CPU 3 and sub-CPU's 21.

In FIG. 6, first at a step S1, the main CPU 3 detects, as described hereinbefore, whether or not performance information (performance event) input via the performance operation element 1 or preset performance information (performance event) has been generated. Then, it is determined at a step S2 whether or not the detected performance event is a key-on event. If the performance event is a key-on event, the program proceeds to a step S3, whereas if the performance event is not a key-on event, it is determined at a step S7 whether or not the performance event is a key-off event. If the performance event is a key-off event, the program proceeds to a step S8, whereas if the performance event is not a key-off event, the present tone generation control program is terminated.

At the step S3, a key depression timer KON_TIMER (KC) which is one of the software timers provided on the RAM 5 as described hereinbefore and allocated to a key code KC corresponding to the detected key-on event is turned on (i.e. time measurement is started), and at the same time, the performance information-generating section 31 generates performance information as described hereinabove and supplies the same to the TG's 9. Processing to be executed at the following steps S4 to S6 is carried out by the sub-CPU 21 in a TG 9, and hence description thereof will be made hereinafter.

At the step S8, the value or count of the key depression timer KON_TIMER (KC) is checked. If the value is smaller than a predetermined limit value TLIMIT (KC) (KON_TIMER (KC)<TLIMIT (KC)), the performance information-generating section 31 generates the performance information as described above, and then the program proceeds to processing mainly for generating first and second auxiliary musical tones, i.e. to steps S9 to S13 which are executed by the sub-CPU 21 in the TG 9, whereas if the value is equal to or larger than the predetermined limit value TLIMIT (KC) (KON_TIMER (KC)>TLIMIT (KC)), the performance information-generating section 31 generates the performance information as described above, and then the program proceeds to processing mainly for generating a second auxiliary musical tone, i.e. to steps S14 to S18 which are executed by the sub-CPU 21 in the TG 9.

At the step S4, a TG 9 which should generate a musical tone signal corresponding to the key code KC of the performance information generated by the main CPU 3, i.e. a TG number i of the TG 9 is detected. More specifically, the FIG. 4 table data is searched based on the pitch name information included in the key code KC, to determine the corresponding pitch name, and then a TG 9 to which the determined pitch name is assigned is determined. For instance, when the pitch name information is "4", the corresponding pitch name is determined to be "D#", and hence the corresponding TG is determined to be the third TG (i=3).

Then, at the step S5, a channel CH [i, KC] (i: TG number, KC: the key code of a tone to be generated in this channel) is determined as a tone-generating channel, and at the following step S6, a main tone-generating process, i.e. a process of transferring control information including the initial touch data IT (KC) to the tone-generating channel CH [i, KC] and then instructing the tone-generating channel CH [i, KC] to perform key-on operation is executed.

At the step S9, similarly to the step S4, the TG number of a pitch name-assigned TG is detected, and at the following step S10, a process of determining tone-generating channels (STH1 [i, KC, ST1], STH2 [i, KC, ST2]), respectively, for the first auxiliary musical tone ST1 and the second auxiliary musical tone ST2 is executed. Here, if a setting is made or a tone color is selected such that one or both of the first auxiliary musical tone ST1 and the second auxiliary musical tone ST2 are not to be generated, only a tone-generating channel for an auxiliary musical tone to be generated may be determined. Then, at a step S11, auxiliary tone volumes (VOL1=STVTBL1 [KON_TIMER(KC), OFFT], VOL2=STVTBL2 [MTLVL(i,KC), OFFT]) are determined. The equation VOL1=STVTBL1 [KON_TIMER(KC), OFFT] means that the volume VOL1 of the first auxiliary musical tone ST1 is determined by referring to a STVTBL1 table in which volume values are provided in correspondence with values of KON_TIMER(KC) and OFFT, and the equation VOL2 STVTBL2 [MTLVL(i,KC), OFFT] means that the volume VOL2 of the second auxiliary musical tone ST2 is determined by referring to a STVTBL2 table in which volume values are provided in correspondence with levels of the main musical tone being generated at a tone pitch corresponding to the KC value with TGi selected and values of OFFT. Instead of referring to such tables, other kinds of calculations may be employed to determine the values of VOL1 and VOL2. At the following step S12, an auxiliary tone-generating process of transferring control information including the volume values VOL1, VOL2 determined at the step S11 to the respective tone-generating channels STCH1, STCH2 determined at the step S10 and then instructing the tone-generating channels STCH1, STCH2 to perform respective key-on operations is executed. Further, at a step S13, a process of instructing termination of generation of the main musical tone generated at the step S6, or more specifically a process of instructing the tone-generating channel CH [i, KC] for the main musical tone to stop generation of the tone is executed.

At the step S14, similarly to the step S4, the TG number of a pitch name-assigned TG is detected, and at the following step S15, a process of determining a tone-generating channel (STH2 [i, KC, ST2]) for the second auxiliary musical tone ST2 is executed. Then, at a step S16, the auxiliary tone volume (VOL2=STVTBL2 [MTLVL(i,KC), OFFT]) is determined, and at a step S17, an auxiliary tone-generating process of transferring control information including the volume value VOL2 determined at the step S16 to the tone-generating channel STCH2 determined at the step S15 and then instructing the tone-generating channel STCH2 to perform key-on operation is executed. Further, at the step S18, similarly to the step S13, a process of instructing termination of generation of the main musical tone generated at the step S6 to be stopped is executed.

As described above, in the present embodiment, to generate a plurality of musical tones are generated simultaneously by using a plurality of TG's, at least one or more pitch name is assigned to each of the TG's, and each musical tone signal indicative of a musical tone which is instructed to be sounded is generated by a TG to which is assigned the pitch name of the musical tone signal. Therefore, tone generation loads are evenly distributed between the TG's, whereby a tone generation load per TG can be reduced.

Further, in the present embodiment, information concerning the level of a main musical tone at a key-off event is directly monitored, then auxiliary-tone characteristic information is determined based on the monitored information, and finally, an auxiliary musical tone is generated based on the determined auxiliary-tone characteristic information, so that more real performance tones of a musical instrument can be reproduced than by the prior art.

Further, auxiliary-tone characteristic information is determined according to the tone pitch of a main musical tone at a key-off event, and an auxiliary musical tone is generated based on the determined auxiliary-tone characteristic information, so that more real performance tones of a musical instrument, especially a harpsichord, can be reproduced than by the prior art.

Although in the above described embodiment, the PCM sampling sound source is adopted for a sound source system, this is only by way of an example, and the present invention is not dependent on the kind of a sound source, but is effectively applicable to any kind of sound source including the software sound source.

Further, it goes without saying that the object of the present invention can be achieved by supplying a storage medium in which a program code that implements the functions of the above described embodiment is recorded, to a system or an apparatus, and causing a computer (or a main CPU, MPU) of the system or the apparatus to read and execute the program code stored in the storage medium.

In this case, the program code itself read from the storage medium implements the novel features of the present invention, and the storage medium which stores the program code constitutes the present invention.

As the storage medium for supplying the program code, for instance, a floppy disk, a hard disk, an optical disk, a magneto-optical disk, a CD-ROM, a CD-R, a magnetic tape, a non-volatile memory card, a ROM, and the like can be used. Further, the program code may be supplied from a server computer via another MIDI apparatus or instrument or a communication network.

Moreover, it is to be understood that the functions of the above described embodiment can be realized not only by executing a program code read out by a computer, but also by causing an operating system (OS) that operates on the computer to perform a part or the whole of the actual operations according to instructions of the program code.

Furthermore, the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiment.

What is claimed is:

1. A musical tone-generating apparatus comprising:

a performance information supply section that supplies performance information simultaneously instructing a start of generation of musical tones corresponding to each of a plurality of tone pitches and including key codes, each of which has first information representing a name of a note selected from the group comprising C, C#, D, D#, E, F, F#, G, G#, A, A# and B, and second information representing an octave;

a musical tone-generating section group comprising a plurality of musical tone-generating sections;

an assignment section that assigns a musical tone of each tone pitch indicated by said performance information supplied by said performance information supply section to a corresponding one of said musical tone-generating sections of said musical tone-generating section group according solely to said each first information included in said performance information; and a control section that controls said musical tone-generating sections such that said musical tone of said each tone is generated by said corresponding one of said musical tone-generating sections according to said each key code included in said performance information.

2. A musical tone-generating apparatus according to claim 1, including a musical tone output section that adds together outputs from said musical tone-generating sections, and delivers a sum of said outputs.

3. A musical tone-generating apparatus according to claim 2, wherein said musical tone-generating sections are connected in series with each other, whereby said musical tone output section sequentially adds together said outputs from said musical tone-generating sections, and delivers the sum of said outputs.

4. A musical tone-generating apparatus comprising:

a performance information supply section that supplies performance information including at least key-on information and key-off information;

a musical tone-generating section that is responsive to supply of said key-on information from said performance information supply section, for generating a main musical tone having a tone pitch and at least one other characteristic indicated by said key-on information, and is responsive to supply of said key-off information from said performance information supply section, for attenuating a main musical tone having a tone pitch indicated by said key-off information and being generated and for generating a key-off sound;

a determination section that determines at least one characteristic of said key-off sound to be generated, based on at least one characteristic of said main musical tone; and a control section that controls said musical tone-generating section such that said key-off sound is generated by said musical tone-generating section according to said at least one characteristic of said key-off sound determined by said determination section.

5. A musical tone-generating apparatus according to claim 4, including a detecting section that detects at least one parameter related to said at least one characteristic of said key-off sound to be generated, and wherein said determination section determines said at least one characteristic of said key-off sound to be generated, based on the detected at least one parameter.

6. A musical tone-generating apparatus according to claim 5, wherein said detecting section detects the at least one characteristic of said main musical tone of said tone pitch indicated by said key-off information when said key-off information is supplied from said performance information supply section.

7. A musical tone-generating apparatus according to claim 4, wherein said determination section sets said at least one characteristic of said key-off sound to be generated to at least one characteristic corresponding to said tone pitch indicated by said key-off information, when said key-off information is supplied from said performance information supply section.

8. A musical tone-generating apparatus according to claim 5, wherein said detecting section includes a time measurement section that measures, as said at least one parameter, time elapsed from the supply of said key-on information to the supply of said key-off information.

9. A musical tone-generating apparatus according to claim 5, wherein said musical tone-generating section includes a main musical tone-generating section that generates said main musical tone, and wherein said detecting section includes a main musical tone characteristic-detecting section that detects, as said at least one parameter, at least one of an output level and an envelope characteristic of said main musical tone-generating section when said key-off information is supplied from said performance information supply section.

10. A musical tone-generating apparatus according to claim 5, wherein said musical-tone generating section includes a main musical tone-generating section that generates said main musical tone, and a key-off sound-generating section that generates said key-off sound, and wherein said detecting section includes a time measurement section that measures, as one of said at least one parameter, time elapsed from the supply of said key-on information to the supply of said key-off information, and a main musical tone characteristic-detecting section that detects, as another of said at least one parameter, at least one of an output level and an envelope characteristic of said main musical tone-generating section when said key-off information is supplied, and wherein said determination section determines said at least one characteristic of said key-off sound to be generated, based on at least one of an output from said time measurement section and an output from said main musical tone characteristic-detecting section.

11. A musical tone-generating apparatus according to claim 10, wherein said determination section determines said at least one characteristic of said key-off sound to be generated, based on said output from said main musical tone characteristic-detecting section, when said time measured by said time measurement section is longer than a predetermined time period.

12. A musical tone-generating apparatus according to claim 10, wherein said determination section includes a selecting device that selects one of said output from said time measurement section and said output from said main musical tone characteristic-detecting section, said determination section determining said at least one characteristic of said key-off sound to be generated, based on the selected output.

13. A storage medium storing a program that can be executed by a computer, said program comprising:

a supply module that causes a performance information supply section to supply performance information simultaneously instructing a start of generation of musical tones corresponding to each of a plurality of tone pitches and including key codes, each of which has first information representing a name of a note selected from the group comprising C, C#, D, D#, E, F, F#, G, G#, A, A# and B, and second information representing an octave;

a musical tone-generating section module comprising a plurality of musical tone-generating sections;

an assignment module that assigns a musical tone of each tone pitch indicated by said supplied performance information to a corresponding one of said musical tone-generating sections according solely to said each first information included in said performance information; and a control module that controls said musical tone-generating sections such that said musical tone of said each tone is generated by said corresponding one of said musical tone-generating sections according to said each key code included in said performance information.

14. A storage medium storing a program that can be executed by a computer, said program comprising:

a supply module that causes a performance information supply section to supply performance information including at least key-on information and key-off information;

a musical tone-generating module that is responsive to supply of said key-on information from said performance information supply section, for generating a main musical tone having a tone pitch and at least one other characteristic indicated by said key-on information, and is responsive to supply of said key-off information from said performance information supply section, for attenuating a main musical tone having a tone pitch indicated by said key-off information and being generated and for generating a key-off sound;

a determination module that determines at least one characteristic of said key-off sound to be generated, based on at least one characteristic of said main musical tone; and a control module that controls said musical tone-generating module such that said key-off sound is generated by said musical tone-generating module according to said at least one characteristic of said key-off sound determined by said determination module.

15. A storage medium according to claim 14, wherein said program includes a detecting module that detects at least one parameter related to said at least one characteristic of said key-off sound to be generated, and wherein said determination module determines said characteristic of said key-off sound to be generated, based on the detected at least one parameter.

16. A storage medium according to claim 15, wherein said detecting module detects at least one characteristic of said main musical tone of said tone pitch indicated by said key-off information when said key-off information is supplied from said performance information supply section.

17. A storage medium according to claim 14, wherein said determination module sets said at least one characteristic of said key-off sound to be generated to at least one characteristic corresponding to said tone pitch indicated by said key-off information, when said key-off information is supplied from said performance information supply section.

18. A storage medium according to claim 15, wherein said detecting module includes a time measurement module that measures, as said at least one parameter, time elapsed from the supply of said key-on information to the supply of said key-off information.

19. A musical tone-generating method comprising the steps of:

causing a performance information supply section to supply performance information simultaneously instructing a start of generation of musical tones corresponding to each of a plurality of tone pitches and including key codes, each of which has first information representing a name of a note selected from the group comprising C, C#, D, D#, E, F, F#, G, G#, A, A# and B, and second information representing an octave;

arranging a musical tone-generating section group comprising a plurality of musical tone-generating sections;

assigning a musical tone of each tone pitch indicated by said supplied performance information to a corresponding one of said musical tone-generating sections according solely to said each first information included in said performance information; and controlling said musical tone-generating sections such that said musical tone of said each tone is generated by said corresponding one of said musical tone-generating sections according to said each key code included in said performance information.

20. A musical tone-generating method comprising the steps of:

causing a performance information supply section to supply performance information including at least key-on information and key-off information;

generating a main musical tone having a tone pitch and at least one other characteristic indicated by said key-on information in response to supply of said key-on information from said performance information supply section;

generating a key-off sound while attenuating a main musical tone having a tone pitch indicated by said key-off information and being generated, in response to supply of said key-off information from said performance information supply section;

determining at least one characteristic of said key-off sound to be generated, based on at least one characteristic of said main musical tone; and controlling said key-off sound-generating step such that said key-off sound is generated according to the determined at least one characteristic of said key-off sound.

* * * * *